United States Patent [19]

Sano et al.

[11] Patent Number: 5,745,317
[45] Date of Patent: Apr. 28, 1998

[54] APPARATUS FOR REPRODUCING INFORMATION FROM A TAPE-SHAPED RECORDING MEDIUM USING CALCULATED ADDRESS INFORMATION

[75] Inventors: Takanobu Sano, Kanagawa; Takuji Himeno, Chiba; Katsumi Ikeda, Kanagawa; Hiroshi Takahata, Tokyo, all of Japan

[73] Assignee: Sony Corporation, Tokyo, Japan

[21] Appl. No.: 541,652

[22] Filed: Oct. 10, 1995

[30] Foreign Application Priority Data

Oct. 14, 1994 [JP] Japan ................................. 6-249008

[51] Int. Cl.$^6$ ........................... G11B 15/52; G11B 15/46; G11B 5/584
[52] U.S. Cl. ................ 360/73.11; 360/72.2; 360/73.04; 360/77.12
[58] Field of Search ................................ 360/69, 70, 71, 360/72.2, 73.11, 77.01, 73.04, 18, 27, 64, 77.12–77.15; 386/73, 78, 79, 80, 87

[56] References Cited

U.S. PATENT DOCUMENTS 5,499,144  3/1996  Inoue et al. .............................. 360/70
5,517,370  5/1996  Tanaka .................................... 360/70

FOREIGN PATENT DOCUMENTS

0544279  6/1993  European Pat. Off. ......... G11B 20/10
0600495  6/1994  European Pat. Off. ......... G11B 27/32

Primary Examiner—Aristotelis M. Psitos
Assistant Examiner—Regina Y. Neal
Attorney, Agent, or Firm—Jay H. Maioli

[57] ABSTRACT

A reproducing device for reproducing information from a tape-shaped recording medium, such as a magnetic tape, in which address information and data are recorded on the recording medium on a plurality of inclined tracks. The address information is composed of a track address and a block address. The reproducing device, which reads and reproduces data from the tape-shaped recording medium includes a reproducing unit, an address extracting unit, a memory, a driving unit and a controller. The reproducing unit reads out data from the tape-shaped reproducing medium for data reproduction. The reproducing unit has a rotary head configured for scanning a plurality of tracks of the tape-shaped recording medium for reading out data from the recording medium. The address extracting unit extracts the address information from data read out by the reproducing unit from one scan of the tape-shaped recording medium by the rotary head. The memory stores data read out from the reproducing unit. The data read out from the reproducing unit is written in the memory based upon the address information extracted by the address extraction unit. The driving unit runs the tape-shaped recording medium. The controller generates read-out addresses for reading out the data stored in the memory. The controller controls the driving unit based upon the address information which is extracted by the address extraction unit and which is associated with pre-set locations on the track of the tape-shaped recording medium.

8 Claims, 5 Drawing Sheets

APPARATUS FOR REPRODUCING INFORMATION FROM A TAPE-SHAPED RECORDING MEDIUM USING CALCULATED ADDRESS INFORMATION

BACKGROUND

1. Field of the Invention

This invention relates to a device for reproducing information from a tape-shaped recording medium. More particularly, it relates to a device for reproducing information from a tape-shaped recording medium having a memory for storing data read out from the tape-shaped recording medium.

2. Background of the Invention

Nowadays, a system for satisfactorily reproducing digital data under application of a so-called non-tracking system without effecting tracking control of data recording tracks has been developed as a recording and/or reproducing device for recording/reproducing the digital data on or from a magnetic tape. Elucidation of this system may be found e.g., in U.S. Pat. No. 4,774,605 and JP Patent Kokoku Publication JP-B-3-3308.

This non-tracking system is now explained. If data is recorded on a magnetic tape by a magnetic head provided on a helical scan type rotary drum, a plurality of tracks $T_{A1}$, $T_{B1}$, $T_{A2}$, $T_{B2}$, ..., inclined relative to the longitudinal direction of the magnetic tape 100, are sequentially formed, as shown in FIG. 1.

Track addresses and block addresses, specifying track numbers and recording positions in each track, respectively, are appended to the data recorded on the inclined tracks such as $T_{A1}$, $T_{B1}$, $T_{A2}$, $T_{B2}$.

If the recorded data is to be reproduced without applying the non-tracking system, it is necessary to effect tracking control so that the respective inclined tracks $T_{A1}$, $T_{B1}$, $T_{A2}$, $T_{B2}$, ... will be scanned by the magnetic head provided on the rotary drum. That is, the magnetic head scanning of a preset track, such as the track $T_{B2}$, needs to be controlled to trace the track along a line passing substantially through the center of the track $T_{B2}$ i.e. $t_0$.

Figure 1:
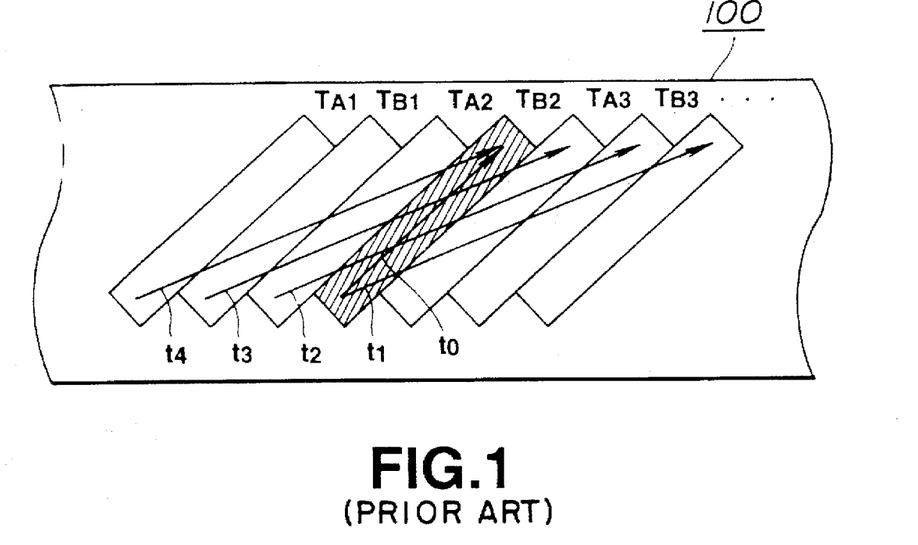
FIG. 1 illustrates the playback state with the non-tracking system.

Conversely, for reproducing the recorded data by the non-tracking system, the magnetic head scanning of the inclined tracks $T_{A1}$, $T_{B1}$, $T_{A2}$, $T_{B2}$ which includes tracing these tracks along tracing lines $t_1$ to $t_4$ inclined with respect to the tracks such as tracks $T_{A1}$, $T_{B1}$, $T_{A2}$, $T_{B2}$, as shown in FIG. 1. That is, with the non-tracking system, the rotary drum is rotated at an increased rate of rpm of at least two times for causing the magnetic head to scan the recorded tracks at a scanning density twice or more for reading out the recorded data without controlling the tracing inclination so as to be coincident with the track inclination.

Figure 2:
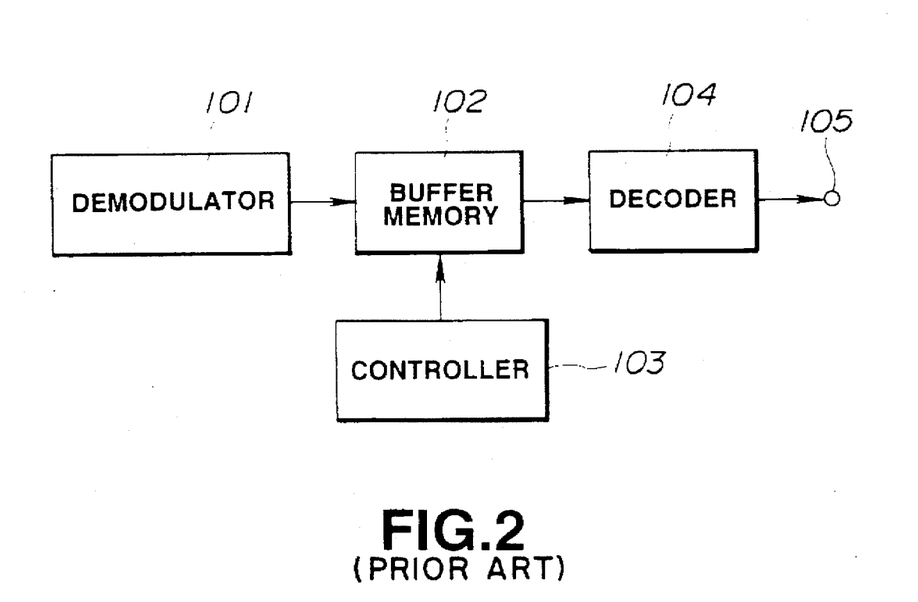
FIG. 2 is a schematic block diagram showing a reproducing device of the non-tracking system.

The data read out is demodulated by a demodulator 101 so as to be stored temporarily in a buffer memory 102 as playback data, as shown in FIG. 2.

At this time, the above-mentioned track addresses are extracted from the read-out data so as to be written at random on the buffer memory 102 in accordance with these track addresses. Thus, all playback data are written in the buffer memory 102 in the correct sequence by two scanning operations of the magnetic head.

The playback data written in the buffer memory 102 is read out therefrom in the track sequence at a pre-set transmission rate under timing control by a controller 103 constituted by a micro-computer.

This timing control is explained in more detail. With the non-tracking system, the running speed of the magnetic tape is servo-controlled for maintaining a substantially constant data quantity in the buffer memory 102 for thereby prohibiting an underflow or overflow of the buffer memory 102 otherwise caused by the track address written in the buffer memory 102 approaching to or excessively separating from the track address read out from the buffer memory, respectively. The track address written in the buffer memory and the track address read out from the buffer memory are herein termed the write address and the read-out address, respectively.

That is, if the write address is compared to a reference address, generated to high precision by a quartz oscillator, not shown, the address difference, as the result of the comparison, is equivalent to the difference between the write address and the read-out address. The magnetic tape speed is then controlled so that the address difference will be kept at a value proximate to a desired value.

The playback data, read out at the pre-set transmission rate under timing control by the controller 103, is corrected for errors by the decoder 104 so as to be outputted at an output terminal 105.

The write address required for effecting the above-described timing control was obtained by the controller 103 by having communication with a digital signal processor (DSP), not shown, over a data bus, during data reproduction, that is while the magnetic head is in direct contact with the magnetic tape. Such communication of the controller 103 with the outside, i.e. DSP during data reproduction gives rise to noise and may lead to failure in improving the S/N ratio of the playback data.

With the non-tracking system, since data of a plurality of tracks are read out with each scan by the magnetic head, as shown in FIG. 1, the write address obtained by the communication of the controller 103 with the DSP is fluctuated depending upon the communication timing. Since the controller 103 controls the running speed of the magnetic tape based upon the obtained write address, it has not been possible to control the running speed of the magnetic tape accurately. In addition, since the write address employed in writing data in the buffer memory 102 is the information consisting only of the track address specifying the track number, it has not been possible to write the address correctly at a pre-set location in the buffer memory 102. The result is that the playback data is subject to sampling fluctuations, that is that it has not been possible to prevent jitter from its occurrence.

SUMMARY OF THE INVENTION

It is therefore an object of the present invention to provide a device for reproducing information from a tape-shaped recording medium which resolves the above-mentioned problems.

According to the present invention, there is provided a reproducing device for reproducing information from a tape-shaped recording medium, such as a magnetic tape, having recorded thereon address information along with data on inclined tracks. The address information is composed of a track address and a block address specifying the position in the track. The reproducing device includes a read-out unit, an address extracting unit, a memory, a storage unit and a controller. The read-out unit reads out data from the tape-shaped recording medium. The address extracting unit extracts the address information from data read out by the readout unit from one scan of the tape-shaped recording medium by the read-out unit. The memory stores data read out from the read-out unit. The data read out from the read-out unit is written in the memory based upon the address information extracted by the address extraction unit. The controller generates addresses for reading out the data stored in the storage unit. The controller controls the driving unit based upon the address information which is extracted by the address extraction unit and which is associated with pre-set locations on the track of the tape-shaped recording medium for controlling the running speed of the tape-shaped recording medium.

According to the present invention, there is also provided a reproducing device for reproducing information from a tape-shaped recording medium, such as a magnetic tape, having recorded thereon address information along with data on a plurality of inclined tracks. The address information is composed of a track address and a block address specifying the position in the track. The reproducing device includes a read-out unit, an address extracting unit, a memory, a driving unit and a controller. The read-out unit reads out data from the tape-shaped recording medium. The read-out unit has a rotary head configured for scanning a plurality of tracks of the tape-shaped recording medium for reading out data from the recording medium. The address extracting unit extracts the address information from data read out by the readout unit from one scan of the tape-shaped recording medium by the rotary head. The memory stores data read out from the read-out unit. The data read out from the read-out unit is written in the memory based upon the address information extracted by the address extraction unit. The driving unit runs the tape-shaped recording medium. The controller generates read-out addresses for reading out the data stored in the memory. The controller controls the driving unit based upon the address information which is extracted by the address extraction unit and which is associated with pre-set locations on the track of the tape-shaped recording medium for controlling the driving unit.

DESCRIPTION OF THE INVENTION

Referring to the drawings, an illustrative embodiment of a reproducing device for a tape-shaped recording medium according to the present invention will be explained in detail. The description of the present embodiment is made with reference to a reproducing device in which a magnetic tape is employed as the tape-shaped recording medium and data recorded on the magnetic tape is read out by a magnetic head provided on a rotary drum.

Figure 3:
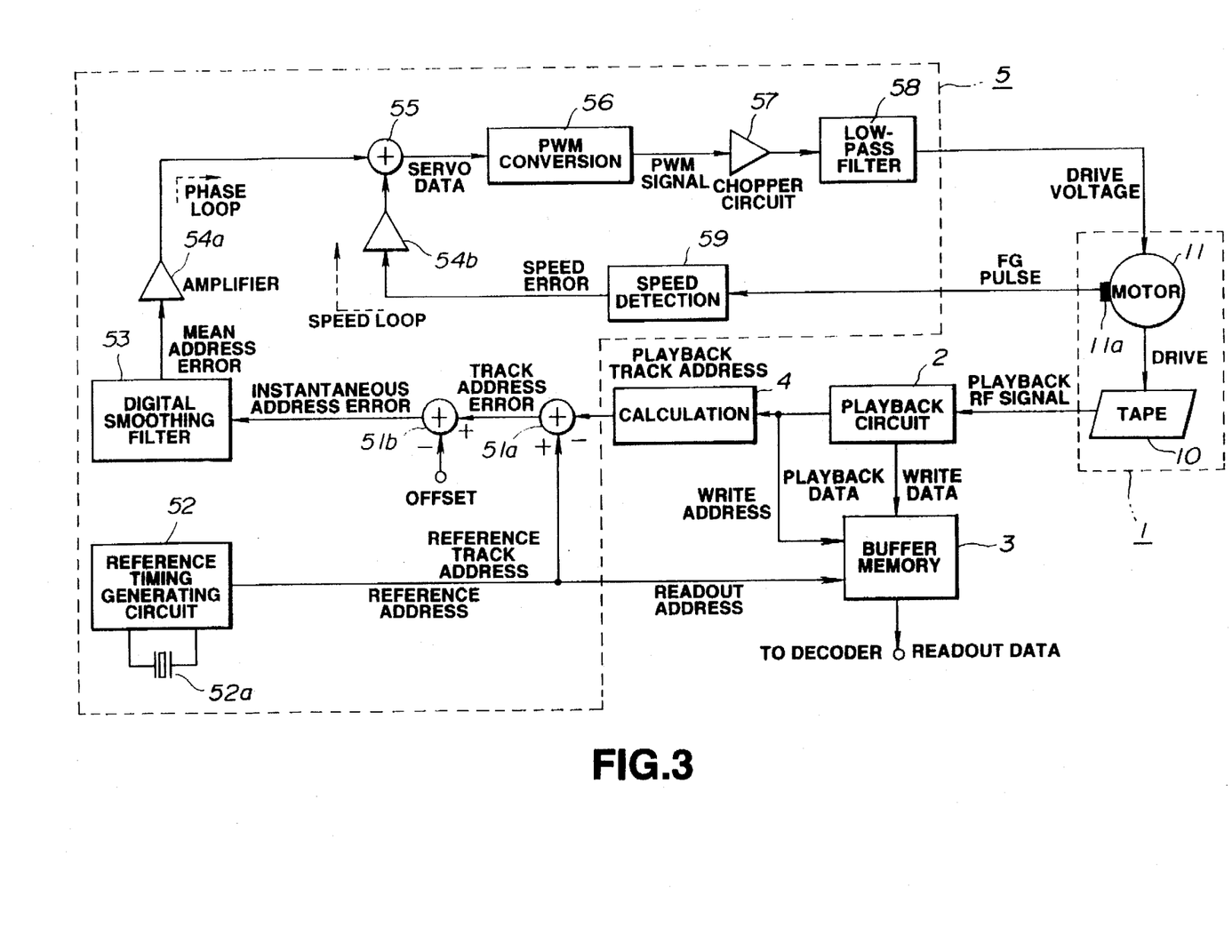
FIG. 3 is a block diagram showing a reproducing device according to the present invention.

Referring to FIG. 3, the reproducing device of the present invention includes a read-out unit 1 for reading out data recorded on a magnetic tape 10, and a reproducing circuit 2 for extracting the address information of the data read out by the read-out unit 1. The reproducing unit also includes a calculation unit 4 for finding the address information of data disposed at the track center from the address information extracted by the reproducing circuit 2, and a buffer memory 3 for storing data read out by the read-out unit 1 based upon the address information extracted by the reproducing circuit 2. Finally, the reproducing device includes a controller 5 for controlling the running speed of the magnetic tape 10 depending upon the address information as found by the calculation unit 4.

The read-out unit 1 reads out data recorded on the magnetic tape 10 by a magnetic head arranged on a rotary drum, not shown, adapted for being rotated about an axis of rotation inclined at a pre-set angle with respect to the running direction of the magnetic tape 10. That is, the read-out unit 1 has a motor 11 for running the rotary drum in rotation. The rotary shaft of the motor 11 is fitted with a frequency generator (FG) 11a configured for generating pulses of a frequency which is in agreement with the rpm of the rotary drum (FG pulses).

Figure 4:
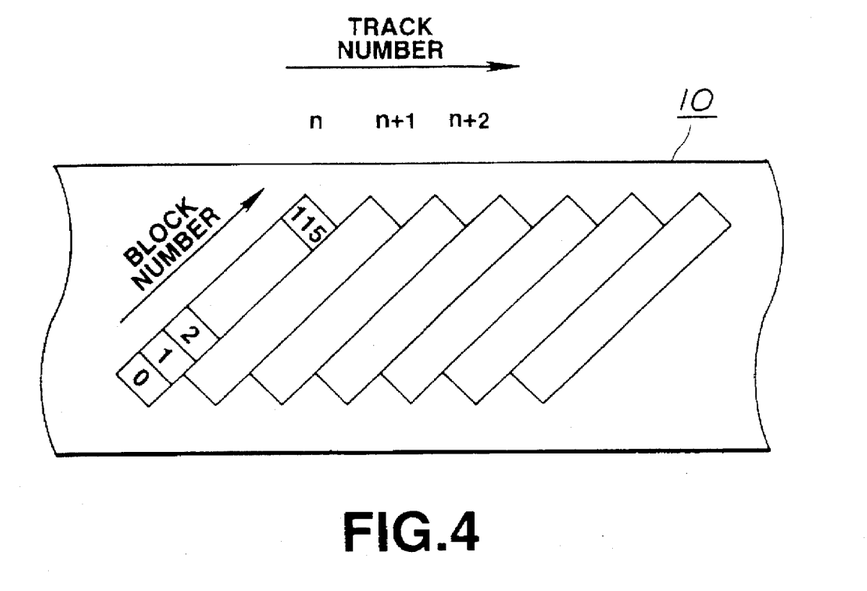
FIG. 4 illustrates the data recording state on a magnetic tape.

Digital data, such as digital audio data, are recorded by the magnetic head on the magnetic tape 10 so that tracks n+1, n+2, ... inclined with respect to the longitudinal direction are sequentially formed, as shown in FIG. 4. To each block of the data recorded on each track are appended a track address specifying the track number, a block address specifying the recording position in each track and a cyclic redundancy check (CRC) code for detecting data errors. At a mid portion of each of the tracks n, n+1, n+2, ... are recorded control data having information, such as time information or absolute address information.

Figure 8:
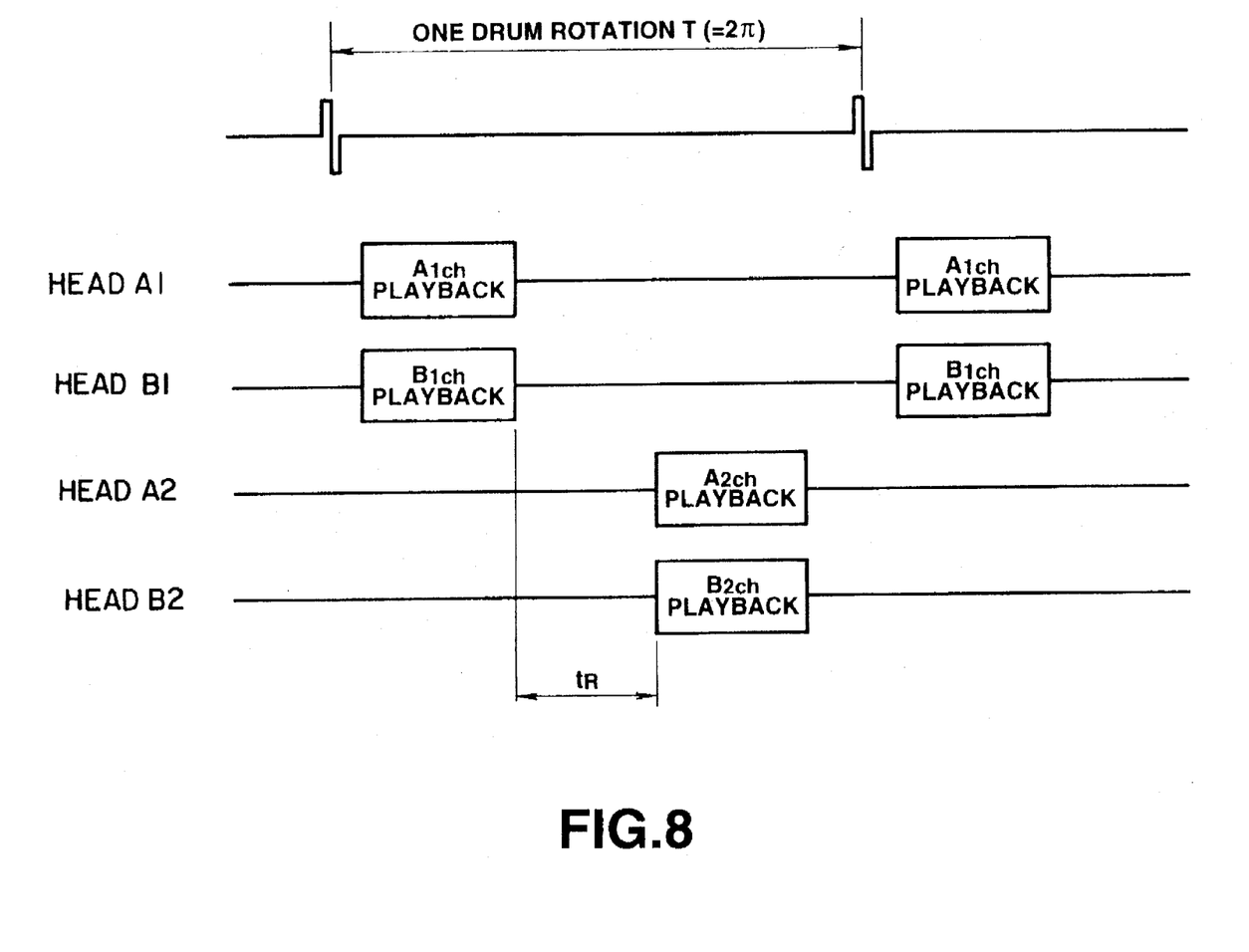
FIG. 8 illustrates the address information acquisition timing by the controller.

The timing of signal reproduction by the magnetic head is controlled to be constant by the controller 5 controlling the driving of the motor 11. For example, the high-frequency signals (RF signals) reproduced by the magnetic head mounted on the rotary drum assume a waveform corresponding to the recorded data at a timing of track scanning by the magnetic tape 10. A plurality of sets of magnetic heads $A_1$, $A_2$, $B_1$, $B_2$ are provided on the rotary drum, as shown in FIG. 8.

The reproducing circuit 2 extracts only the RF signals outputted by the magnetic head by way of data reproduction.

That is, the reproducing circuit 2 includes a digital signal processor (DSP), not shown. The DSP is made up mainly of a digital filter for analog/digital and digital/analog converters, a polygonal-line companding circuit, an encoder/decoder for error correction code, low deviation modulation (LDM)-2 modulator/demodulator and a non-tracking processing circuit. The DSP performs the acquisition of the data address information of data read out by the read-out unit 1, time axis expansion, error detection and error correction. The address information acquisition timing of the DSP is synchronized with one full revolution of the rotary drum of the read-out unit 1. Thus the reproducing circuit 2 has a programmable timing generator (PTG), not shown, for generating clocks synchronized with one full revolution of the rotary drum. Thus the DSP latches the address information of data read out by the read-out unit 1 during one full drum revolution using the timing of clock generation of the PTG, at the same time as it effects signal processing, using the timing of clock generation of the PTG as reference, when the magnetic head is at a pre-set phase in the read-out unit 1.

Figure 5:
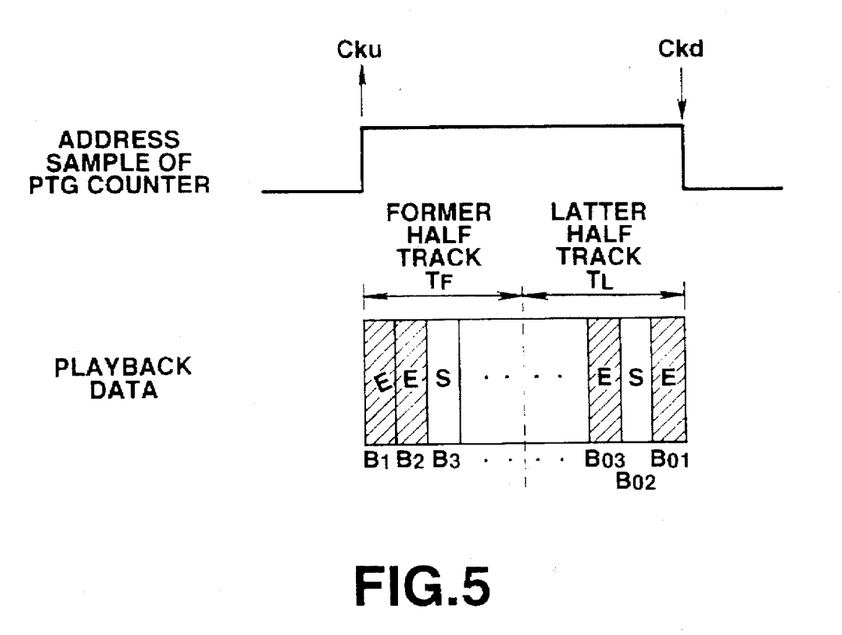
FIG. 5 illustrates the latching timing of the address information during the former half of a track and the address information during the latter half of the track.

At this time, the data address information is comprised of the track address specifying the track number and the block address specifying the recording position in the track. Since data that remains unerased through error may be present at each track end, the PTG causes the clock to rise and decay at positions slightly inwardly of the track ends for defining the range of address samples for limiting an effective data range, as indicated in FIG. 5.

The data read from the magnetic tape 10 by one complete revolution of the rotary drum, that is data read-out from a plurality of adjacent tracks, are written at pre-set locations in the buffer memory 3 based upon the address information latched at a timing referenced to clock generation by the PTG.

The buffer memory 3 is, constituted by e.g., a random access memory (RAM), with the storage capacity of 1 M bits, capable of storing 32-track data.

The calculating unit 4 finds, by calculation of the address information extracted from the reproducing circuit 2 as described above, the block address of a block located at the center of each track from the address information in the former half of the track and the address information in the latter half of the track. It is noted that the address information of data lying at the outer most side within the effective data range is employed as the address information in the former half of the track and the address information in the latter half of the track.

Figure 6:
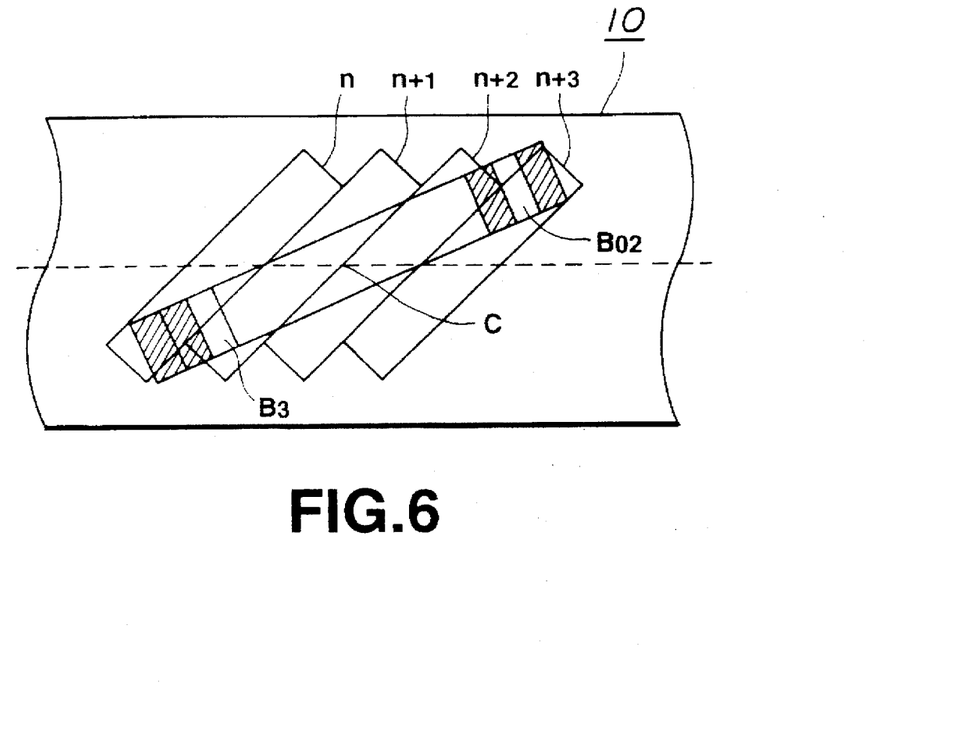
FIG. 6 illustrates the latched address information during the former half and the latter half of the track.

More specifically, the calculating unit 4 is supplied with the address information from the reproducing circuit 2 and with clocks generated by the PTG of the reproducing circuit 2. Using the clocks supplied from the PTG, the calculating unit extracts the address information of a block $B_3$ of the former half track $T_F$ found to be the first correct data block (first CRC safe S block) as from the rise $CK_U$ of the PTG clock and the address information of a block $B_{O2}$ of the latter half track $T_L$ found to be the last correct data block (last CRC safe S block) as from the decay $CK_d$ of the PTG clock, as shown in FIG. 5. From the two data of the address information, the calculating unit finds the address information of the block disposed at the center C of the track, as shown in FIG. 6.

Figure 7:
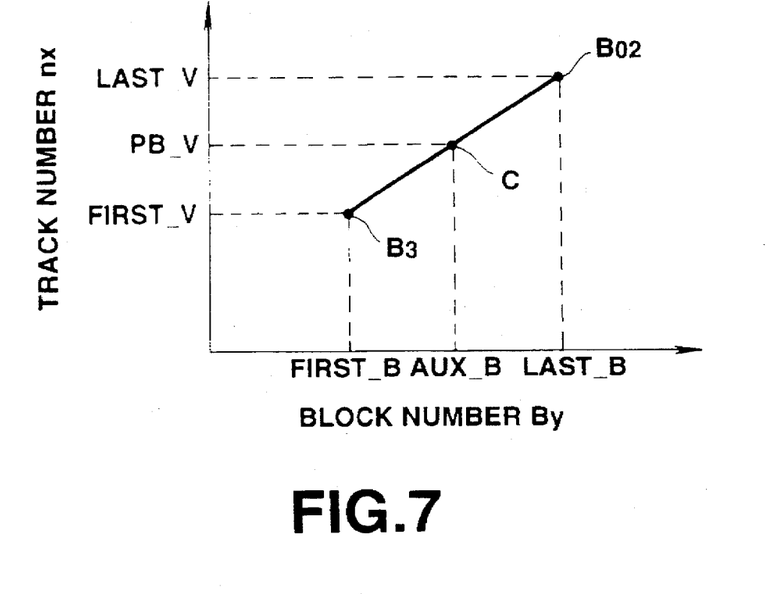
FIG. 7 illustrates the processing for finding the address information in a block located at the track center from the address information during the former half and the latter half of the track.

As represented in FIG. 7, if the address information of the block $B_3$ of the former track half $T_F$, acquired as described above, is represented in terms of the track address FIRST_V and the block address FIRST B, and the address information of the block $B_{O2}$ of the latter track half $T_B$ is represented in terms of the track address LAST V and the block address FIRST_B, the address information, that is the block address PB_V, of the block disposed at the center C of the track is represented by $$PB\_V=(LAST\_V-FIRST\_V)/(LAST\_B-FIRST\_B)\times(AUX\_B-FIRST\_B)+FIRST\_V$$

where AUX_B is the block address of a block in which is recorded control data of the center portion of each track, as previously explained. Using this equation, the address information, that is the track address, of the block disposed at the center C of the track shown in FIG. 6 may be found. It is noted that the greater the distance between the block $B_3$ of the former half track $T_F$ and the block $B_{O2}$ of the latter half block $T_L$, the higher becomes the accuracy with which is found the address information of the block at the track center C.

Using the address information, thus found, the controller 5 compares the address information, as found by the calculating unit 4, with e.g., an accurately generated reference address. The address difference as found by this comparison corresponds to the difference in the read-out address at the time of reading out data by the reproducing circuit 2 from the buffer memory 3 based upon the address information used during data writing in the buffer memory 3, that is the write address and the reference address. The running of the magnetic tape 10 is controlled so that this difference will be maintained in the vicinity of a desired value.

The construction of the controller 5 is explained in detail.

The controller 5 is comprised of a reference timing generating circuit 52, made up of addition/subtraction units 51a, 51b, and a quartz oscillator 52a, a digital smoothing filter 53, amplifiers 54a, 54b, an addition unit 55, a pulse width modulation unit (PWM unit) 56, a chopper circuit 57, a low-pass filter 58 and a speed detecting unit 59.

It is noted that the address information is sent from the calculating unit 4 to the controller 5 so that the timing of acquisition by the controller 5 of the address information as found by the calculating unit 4 corresponds to the time during which data is not reproduced by the read-out unit 1, that is the time during which the magnetic head is not contacted with the magnetic tape 10. For example, the address information is transmitted from the calculating unit 4 to the controller 5 during the time $t_R$ of a period of rotation of the rotary drum T (=$2\pi$) when the magnetic tape 10 is not contacted by the magnetic heads $A_1$, $B_1$, $A_2$, $B_2$, as shown in FIG. 8.

The address information produced as described above, that is the write address, is supplied to the addition/subtraction unit 51a, at the same time as the reference address derived from clocks generated by the quartz oscillator 52a of the reference timing generator 52 is supplied to the addition/subtraction unit 51a.

The addition/subtraction unit 51a subtracts the write address supplied from the calculating unit 4 from the reference address generated by the reference timing generating circuit 52. The result of subtraction is sent as a track error to the addition/subtraction unit 51b.

The addition/subtraction unit 51b is fed from a target phase data generating circuit, not shown, with a phase difference target value, that is an arbitrary offset value. The addition/subtraction unit 51b subtracts the offset value from the target phase data generating circuit from the track error from the addition/subtraction unit 51a. The result of subtraction, as an output of the addition/subtraction unit 51b, is supplied as an instantaneous address error, to the digital smoothing filter 53.

Since the instantaneous address value, obtained by the addition/subtraction unit 51b, is varied by a value corresponding to the magnetic head of the read-out unit 1 traversing the tracks, the digital smoothing circuit 53 averages the instantaneous address errors from the addition/subtraction unit 51b. The averaged instantaneous address errors, as found by the digital smoothing filter 53, are fed to the amplifier 54a for gain adjustment. The averaged and gain-controlled instantaneous address error is supplied to the addition unit 55.

The speed detecting unit 59 is fed from the read-out unit 1 with the FG pulses having a frequency corresponding to the rotary speed of the rotary drum. The speed detecting unit 59 detects speed errors by the FG pulses from the read-out unit 1 and routes the detected speed error via amplifier 54b to the addition unit 55.

The addition unit 55 adds the instantaneous address error supplied thereto from the digital smoothing filter 53 via amplifier 54a to the speed error supplied thereto from the speed detecting unit 59 via amplifier 54b and transmits the sum to the PWM unit 56.

The PWM unit 56 pulse width modulates the signal from the addition unit 55 to form PWM signals as control driving signals which are supplied to the chopper circuit 57.

For reducing the power consumption, the chopper circuit 57 chops the PWM signals from the PWM unit 56 chops the PWM signals from the PWM unit 56 and transmits the resulting signal to the low-pass filter 58.

The low-pass filter 58 eliminates carrier components from the signal from the chopper circuit 57 and transmit the resulting signal as the driving voltage to the motor 11 of the read-out unit 1 for driving and controlling the motor 11.

With the above-described servo loop for the motor 11, the controller 5 manages control for maintaining a substantially constant data quantity held or stored in the buffer memory 3.

The above-described reproducing device operates as follows:

The motor 11 runs a rotary drum, not shown, by the driving voltage supplied from the controller 5. Thus the data recorded on the magnetic tape 10 are read by the recording head provided on the rotary drum. The data read by the magnetic head are supplied to the reproducing circuit 2.

The reproducing circuit 2 latches the address information of the data read out by one full rotation of the rotary drum by the read-out unit 1, in a timed relation to the PTG clocks synchronized with one full rotation of the rotary drum, while processing the read-out data for signal reproduction. The processed data are written as playback data in pre-set positions of the buffer memory 3 based upon the latched address information. The latched address information is also supplied to the calculating unit 4.

The calculating unit 4 detects the address information of both outermost blocks within the effective data area, from the address information supplied thereto from the reproducing circuit 2, and finds the address information of the block disposed at the track center (track address).

The address information, thus found by the calculating unit 4, is transmitted to the controller 5 during the time when the magnetic head is not contacted with the magnetic tape 10 in the read-out unit 1. The controller 5 finds the mean address error from the write address supplied thereto, as shown in FIG. 8. The controller also finds the speed error from the FG pulse from FG 11a, while generating the driving voltage for driving the motor 11 of the read-out unit 1 from the mean address error and the speed error. The controller 5 also generates the reference address based on which data is read out track-sequentially from the buffer memory 3. The data read out from the buffer memory 3 is supplied to e.g., a decoding circuit of a reproducing device and processed in a pre-set manner before being outputted to external equipment.

Thus the motor 1 is driven by the driving voltage derived from the address information as found by the calculating unit 4. By such driving control of the motor 11, the data reproduced from the magnetic tape 10 run at a speed corresponding to rotation of the motor 1 is written track-sequentially at pre-set positions in the buffer memory 3. The data is also read out from the buffer memory 3 track-sequentially based upon the reference address from the controller 5.

Thus, with the illustrated embodiment, since the address information of data located at the track center, among data of a plurality of tracks read out from the magnetic tape by each scanning of the magnetic head, is used as the data write address in the buffer memory, and the running speed of the magnetic tape is controlled based upon the write address, the quantity of data held or stored in the buffer memory may be kept constant at all times, while it is possible to prohibit the write address from being fluctuated.

For finding the address information of the data disposed at the track center, the address information of the data at the outer most positions within the effective data range is found, so that the address information disposed at the track center may be found accurately. This further prohibits the address from being fluctuated at the time the address information is supplied to the controller.

Thus it becomes possible to prohibit jitter otherwise caused by sampling fluctuations.

Since the spare area which is reserved for the case in which the scanning angle of the magnetic head scanning the track is inclined significantly from the pre-set inclination angle can be diminished, the buffer memory can be utilized effectively. In addition, since the storage capacity of the buffer memory is determined by the difference in height of the magnetic head pairs mounted on the rotary drum, the buffer memory can be utilized effectively, so that it becomes possible to use a moderate mounting tolerance of the magnetic head with respect to the rotary drum.

Since the address information employed for controlling the running speed of the magnetic tape is acquired during the time the magnetic head is not contacted with the magnetic tape, it becomes possible to prevent the noise from being produced by communication with outside.

The address information employed for writing the read-out data in the buffer memory is the track address specifying the track number and the block address specifying the recording position in the track, the address information can be written at a correct location within the buffer memory. The result is the improved S/N ratio.

In the above-described embodiment, the address information employed for controlling the running speed of the magnetic tape is the address information of data at the track center as found from the address information of the outer most data in the effective data area. However, it may be the address information of data closest to the address information of data read out from the buffer memory in the effective data area. That is, the data closest to the address information of data currently read from the buffer memory, among data of a plurality of tracks read out from each scan by the magnetic head, may be detected within the effective data area so that the running speed of the magnetic tape will be controlled based upon the address information of the detected data.

What is claimed is:

1. An apparatus for reproducing information from a tape-shaped recording medium having recorded on inclined tracks data in the form of blocks and address information recorded with each of the blocks in the form of a track address and a block address, said block address specifying a position of a respective block in a given track, said apparatus comprising:

read-out means for reading out data by scanning said inclined tracks on said tape-shaped recording medium at a rate at which the inclined tracks were recorded;

address extracting means for extracting said address information from said data for each track read out by said read-out means from said tape-shaped recording medium;

storage means for storing said data read out by said read-out means, in which said data read out by said read-out means is written in said storage means based upon said address information extracted by said address extracting means;

calculating means for calculating a block address of a block disposed substantially at a center of a respective track based upon said address information for said respective track extracted by said address extracting means; and control means for generating a read-out address for reading out said data stored in said storage means and for controlling a running speed of said tape-shaped recording medium based upon a comparison between address information for a pre-set position on a track of said tape-shaped recording medium extracted by said address extracting means and said calculated block address supplied from said calculating means.

2. The apparatus as claimed in claim 1, further comprising speed detection means for detecting a speed error of said tape-shaped recording medium, and wherein said control means includes speed controlling means for controlling said running speed of said tape-shaped recording medium based on said speed error and said calculated block address calculated by said calculating means.

3. The apparatus as claimed in claim 2, wherein said control means further includes reference address generating means for generating a reference address, and wherein results of a comparison of said calculated block address calculated by said calculating means and said reference address generated by said reference address generating means are supplied to said speed controlling means, thereby controlling said running speed of said tape-shaped recording medium.

4. An apparatus for reproducing information from a tape-shaped recording medium having recorded on inclined tracks data in the form of blocks and address information recorded with each of the blocks in the form of a track address and a block address, said block address specifying a position of a respective block in a given track, said apparatus comprising:

read-out means having a rotary head for scanning said inclined tracks on said tape-shaped recording medium in order to read out data from said tape-shaped recording medium at a rate at which the inclined tracks were recorded;

address extracting means for extracting said address information from said data for each track read out by said read-out means from said tape-shaped recording medium;

storage means for storing said data read out by said read-out means, in which said data read out by said read-out means is written in said storage means based upon said address information extracted by said address extracting means;

driving means for running said tape-shaped recording medium;

calculating means for calculating a block address of a block disposed substantially at a center of a respective track based upon said address information for said respective track extracted by said address extracting means; and control means for generating a read-out address for reading out said data stored in said storage means and for controlling a running speed of said tape-shaped recording medium based upon a comparison between address information for a pre-set position on a track of said tape-shaped recording medium extracted by said address extracting means and said calculated block address supplied from said calculating means.

5. The apparatus as claimed in claim 4, further comprising detection means for detecting a speed error of said tape-shaped recording medium, and wherein said control means includes speed controlling means for controlling said driving means based on said speed error and said calculated block address calculated by said calculating means.

6. The apparatus as claimed in claim 5, wherein said control means further includes reference address generating means for generating a reference address, and wherein results of a comparison of said calculated block address calculated by said calculating means and said reference address generated by said generating means are supplied to said speed controlling means, thereby controlling said running speed of said tape-shaped recording medium.

7. The apparatus as claimed in claim 6, wherein said speed controlling means generates pulse-width-modulated signals based upon said comparison results of said calculated block address and said reference address generated by said generating means, and said generated pulse-width-modulated signals are supplied to said driving means.

8. The apparatus as claimed in claim 4, wherein said address information from said calculating means is transmitted to said control means during a time when said rotary head is not scanning said tape-shaped recording medium.

* * * * *